(12) United States Patent
Kikuchi et al.

(10) Patent No.: US 7,151,624 B2
(45) Date of Patent: Dec. 19, 2006

(54) LIGHT SCANNING UNIT

(75) Inventors: Susumu Kikuchi, Yokohama (JP); Takehiro Nismori, Yokohama (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 124 days.

(21) Appl. No.: 10/744,079

(22) Filed: Dec. 24, 2003

(65) Prior Publication Data

US 2004/0184126 A1    Sep. 23, 2004

(30) Foreign Application Priority Data

Dec. 27, 2002    (JP)    ............................. 2002-381086

(51) Int. Cl.
*G02B 26/08* (2006.01)

(52) U.S. Cl. ...................... 359/204; 347/233
(58) Field of Classification Search ........ 359/204–208, 359/216

See application file for complete search history.

(56) References Cited

U.S. PATENT DOCUMENTS 5,181,137 A * 1/1993 Koide ........................ 359/217
5,341,158 A * 8/1994 Appel et al. ................. 347/241

FOREIGN PATENT DOCUMENTS

JP    03-150174    6/1991

\* cited by examiner

*Primary Examiner*—Euncha P. Cherry
(74) *Attorney, Agent, or Firm*—Roylance, Abrams, Berdo & Goodman, LLP

(57) ABSTRACT

A light scanning unit having a simple structure and a low-priced multi-beam shape is provided. The light scanning unit includes a composite light source in which a plurality of light sources for emitting coherent light having different wavelengths are arranged adjacent to one another and the optical axis of each light source are arranged substantially parallel to each other, such that the composite light source emits light at a divergence angle centering on an optical axis. The plurality of coherent emitted light comprising a light beam. The light scanning unit further comprises, and an optical system which comprises a collimator lens which is arranged on an approximately central axis of an optical axis of each light source constituting the composite light source, and collimates the light beam emitted from the composite light source, a cylinder lens for condensing the light beam emitted from the collimator lens, and a polygonal rotating mirror for scanning the light beam condensed by the cylinder lens in a main scanning direction on an exposed surface of an exposed object.

10 Claims, 4 Drawing Sheets

LIGHT SCANNING UNIT

This application claims priority to Japanese Patent Application No. 2002-381086, filed on December 27, in the Japanese Intellectual Property Office, the disclosure of which is incorporated herein in its entirety by reference.

BACKGROUND OF THE INVENTION

1. Field of the Invention

The present invention relates to a light scanning unit, and more particularly, to a light scanning unit suitable for an exposure device for an electrophotographic apparatus, such as a color printer having a plurality of exposed objects.

2. Description of the Related Art

Electrophotographic exposure devices are generally categorized as devices using either a laser diode or devices using a light emitting diode (LED). The electrophotographic exposure device (EPE device)that uses an LED perform an exposure process by mapping one LED per one dot of a pixel of an image to be recorded in an exposed object. In general, the EPE device using the LED uses a light source called a "LED head", in which a plurality of LEDs are arranged.

The light source is configured in such a manner so as to arrange an LED chip in which a plurality of LEDs are formed on a substrate and to form a plurality of LED arrays. Japanese Patent Publication No. Hei 10-035011 (published on Feb. 10, 1998) entitled "Light Emitting Diode Array and Fabrication thereof", the entire contents of which are incorporated herein by reference, discloses this type of configuration. The disclosed apparatus condenses light onto an image-formed surface by providing an optical system between the LED and the exposed surface of the exposed object.

The EPE device that uses the laser diode scans a laser beam in a main scanning direction on an exposed surface of an exposed object using a light scanning unit.

The EPE device using the laser diode uses an F-θ lens to maintain the same scanning speed and same beam shape on an exposed surface. Japanese Patent Publication No. Hei 09-096769 (published on Apr. 8, 1997) entitled "Method and Device for adjusting Optical Axis of Optical Scanner and Optical Scanner", the entire contents of which are incorporated herein by reference, discloses this type of configuration.

In the disclosed apparatus of Japanese Patent Publication No. Hei 09-09679, the laser beam emitted from a laser diode is diffused. The laser beam is then collimated by a collimator lens. The shape of the collimated laser beam is restricted to the shape of a slit, and the laser beam is focused by a cylinder lens in a subscanning direction on the reflective surface of a polygonal rotating mirror, which is a light scanning unit. Subsequently, light scanned in the main scanning direction by the polygonal rotating mirror is focused by an F-θ lens (or lens group) on the exposed surface of the exposed object, and is scanned at a uniform speed.

The electrophotographic exposure device using the LED can be made smaller. However, an EPE device using the LED made smaller has several problems. First, a plurality of LED chips should be precisely arranged on a substrate; second, the required circuitry is complex; third, due to the characteristics of the optical system, the distance from each LED chip to the exposed surface of the exposed object should be maintained precisely; and fourth, the quantity of light emitted between different LEDs is non-uniform, and should be corrected.

In addition, the optical system for scanning a laser diode as a light source which uses a polygonal rotating mirror to scan the light source has a problem as well. Maintaining or knowing the distance with respect to an exposed surface is comparatively low, since the spot of light quantity on an exposed surface is small, the circuit is simple, and the depth of focus is deep.

Meanwhile, color electrophotographic printers have been recently developed. These color electrophotographic printers need to form an image four times, as compared to a conventional black/white printer (which only has to form an image only once). Color printers need to form an image four times because color images are typically produced with four colors, such as cyan, magenta, yellow, and black, into one image.

Electrophotographic color printers are categorized into two types, a single pass electrophotographic color printer or a multi-pass electrophotographic color printer. The single pass electrophotographic color printer mounts one exposure device in one drum, performs a development process using a four-color developer, superimposes an image on an intermediate transfer body, and transfers the superimposed image onto a sheet of paper.

The multi-pass electrophotographic color printer mounts four developers and four exposure devices, and four photosensitive bodies. Therefore, the mechanism appears as four conventional black/white printers superimposed on one another.

In the single pass electrophotographic color printer, the output speed is reduced to one-quarter of that of a multi-pass electrophotographic color printer, requiring the image to be superimposed four times. As a result, the single pass electrophotographic color printer is low speed and the mechanism for moving a developer is complex. The single pass electrophotographic color printer can, however, configure the photosensitive drum and exposure device as a single body.

The printing speed of the multi-pass electrophotographic color printer is faster as compared to the single pass electrophotographic color printer. However, the multi-pass electrophotographic color printer requires four exposure devices and four photosensitive bodies and thus, its structure becomes complex.

The present invention relates to an exposure device for the multi-pass electrophotographic color printer.

Conventional multi-pass electrophotographic color printers typically incorporate the same number of laser diodes as the number of exposed objects. Since there are four exposed objects in the conventional multi-pass electrophotographic color printer, there are four laser diodes. Similarly, the multi-pass electrophotographic color printer also requires a polygonal rotating mirror or an F-θ lens having the same number of mirrors or lens as the number of exposed objects. Again, since there are four exposed objects, the conventional multi-pass electrophotographic color printer has either four lens or four polygonal mirrors. As a result, the size of an apparatus becomes larger, and consequentially, manufacturing costs are increased.

SUMMARY OF THE INVENTION

The present invention provides a light scanning unit having a simple structure and a low-priced multi-beam shape.

According to one embodiment of the present invention, there is provided a light scanning unit which comprises a composite light source in which a plurality of light sources for emitting coherent light having different wavelengths are arranged adjacent to one another and an optical axis of each light source are arranged substantially parallel to each other, such that the composite light source emits light at a divergence angle centering on an optical axis. The embodiment of the present invention further comprises an optical system which comprises a collimator lens which is arranged at or approximately at the central axis of the optical axis of each light source constituting the composite light source, and collimates the light beam emitted from the composite light source. The embodiment of the present invention further provides a cylinder lens for condensing the light beam emitted from the collimator lens, and a polygonal rotating mirror for scanning the light beam condensed by the cylinder lens in a main scanning direction on an exposed surface of an exposed object.

BRIEF DESCRIPTION OF THE DRAWINGS

The above aspects and advantages of the present invention will become more apparent by describing in detail exemplary embodiments thereof, with reference to the attached drawings, in which.

DETAILED DESCRIPTION OF THE INVENTION

Figure 1:
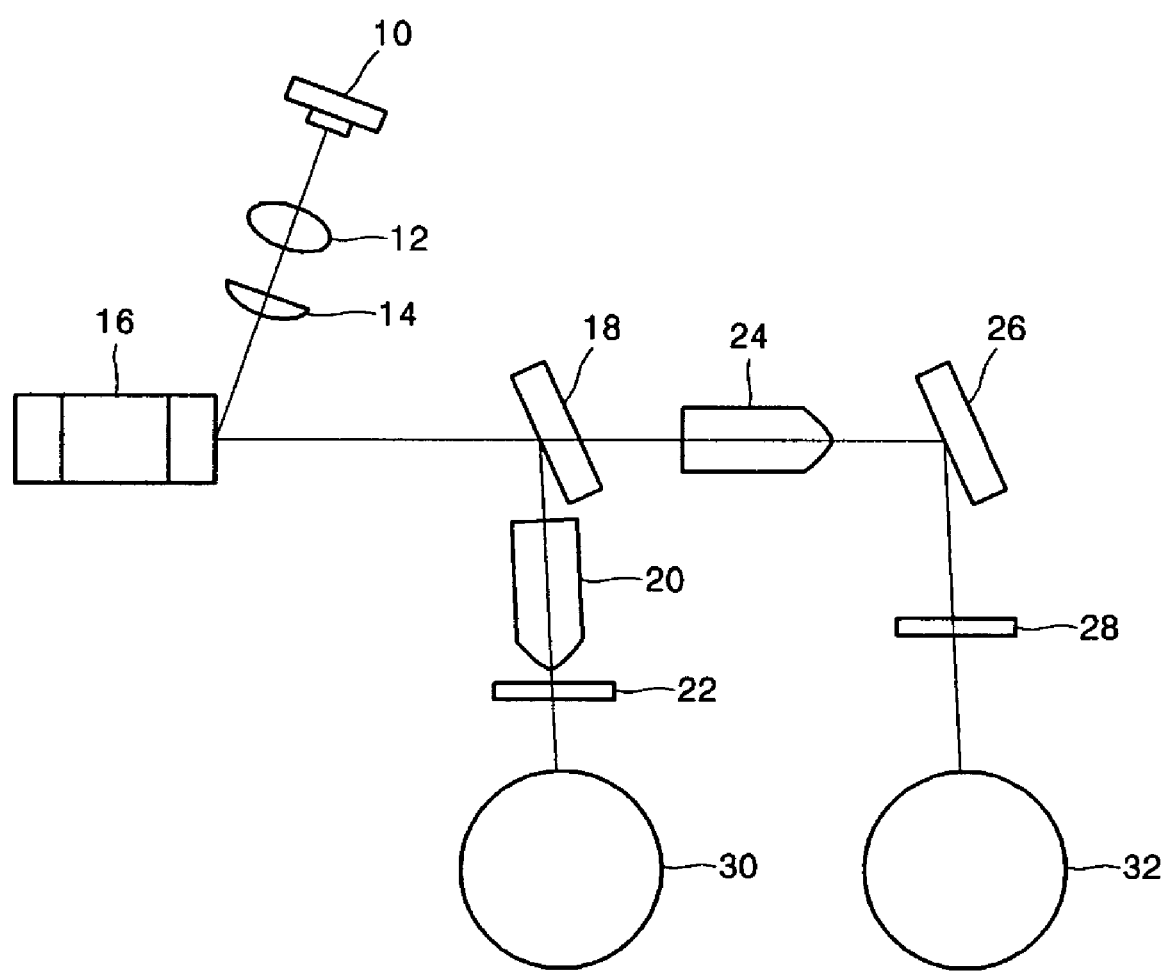
FIG. 1 illustrates a block diagram of an optical arrangement of a light scanning unit according to a first embodiment of the present invention.

Referring to FIG. 1, a light scanning unit according to a first embodiment of the present invention includes a composite light source 10 for emitting a plurality of (in the present embodiment, two) coherent light having different wavelengths, a collimator lens 12, a cylinder lens 14, a polygonal rotating mirror 16, a half mirror 18, a first F-θ lens 20, a first band pass filter 22, a second F-θ lens 24, a mirror 26, and a second band pass filter 28.

In the first embodiment of the present invention, the composite light source 10 is a multi-beam laser diode for emitting two light (coherent light) beams having different wavelengths (for example, wavelengths of 650 nm and 780 nm). The two laser diodes are arranged adjacent to each other. The distance between the two light sources (i.e., laser diodes), which is also the distance between their optical axes, is typically less than or about 1 mm. The optical axes of the light source are arranged substantially parallel to each other. The configuration of the composite light source 10 is well-known to persons skilled in the art, and thus, detailed descriptions thereof will be omitted.

The collimator lens 12 collimates a light beam emitted from the composite light source 10 into a beam of parallel rays. The cylinder lens 14 condenses the light beam onto a reflective surface of the polygonal rotating mirror 16. The cylinder lens 14 has the capability of performing a focusing function only in a subscanning direction of first and second exposed objects 30 and 32 with respect to the transmitted light beam, and does not have the capability in the main scanning direction. The subscanning direction is the rotational direction of the first and second exposed objects 30 and 32, and the main scanning direction is the axial direction of the first and second exposed objects 30 and 32.

The polygonal rotating mirror 16 is rotated and driven by a driving unit (not shown) at a predetermined angular velocity and scans the incident light beam in the main scanning direction of the exposed surfaces of the first and second exposed objects 30 and 32 according to its rotation.

The first F-θ lens 20 condenses the light beam having the shorter wavelength of 650 nm onto the exposed surface of the first exposed object 30, and radiates the condensed light beam to uniformly scan the first exposed object 30.

The second F-θ lens 24 condenses the light beam having the longer wavelength of 780 nm onto the exposed surface of the second exposed object 32, and radiates the condensed light beam to uniformly scan the second exposed object 32.

The first band pass filter 22 transmits only a light beam having the shorter wavelength of 650 nm, and the second band pass filter 28 transmits only a light beam having the longer wavelength of 780 nm.

The first and second exposed objects 30 and 32 are photosensitive drums, for example, and are rotated and driven by a driving unit (not shown) in the subscanning direction.

In the above structure, two light beams having different wavelengths are intensity-modulated by a modulation unit (not shown) according to information on different images and are emitted from the composite light source 10. The two light beams are emitted at a divergence angle centering on an optical axis.

The light beams emitted from the composite light source 10 are collimated by the collimator lens 12. The collimated light beams are then focused by the cylinder lens 14, and are condensed onto the reflective surface of the polygonal rotating mirror 16.

The light beams reflected by the polygonal rotating mirror 16 are split by the half mirror 18 into two parts, a first split light beam, and a second split light beam. The first split light beam part is directed towards the first exposed object 30. Only one of the light beams of the first split light beams is irradiated on the exposed surface of the first exposed object 30 through the first F-θ lens 20 and the first band pass filter 22, and is scanned in the main scanning direction on the exposed surface of the first exposed object 30 according to rotation of the polygonal rotating mirror 16. This occurs because only the light beam having the shorter wavelength of 650 nm is transmitted through the first band pass filter 22. The light beam with the longer wavelength is substantially blocked by first bandpass filter 22. Therefore, the light beam having the shorter wavelength of 650 nm is condensed onto the exposed surface of the exposed object 30 by the action of the first F-θ lens 20 and is scanned at a uniform speed in the main scanning direction of the exposed surface.

The second split light beam is directed to mirror 26 through the second F-θ lens 24 to the second band pass filter 28. Since only a light beam having a longer wavelength of 780 nm is transmitted through the second band pass filter 22, the light beam having the longer wavelength of 780 nm passes through second bandpass filter 28 and is condensed onto the exposed surface of the exposed object 30 by the action of the second F-θ lens 24 and is scanned at a uniform speed in the main scanning direction of the exposed surface of the second exposed object 32.

By the operations discussed immediately above, a first image information is recorded by the light beam having the shorter wavelength on the exposed surface of the first exposed object 30, and a second image information is recorded by the light beam having the longer wavelength on the exposed surface of the second exposed object 32.

In the light scanning unit according to the first embodiment of the present invention, the composite light source for emitting a plurality of light beams having different wavelengths is used as a light source. The first embodiment of the present invention further comprises an optical system of the light scanning unit for scanning each light beam of different wavelengths emitted from the light source in the main scanning direction in a corresponding exposed object. Thus, the configuration of the light scanning unit of the prior art has been simplified, and a low-priced light scanning unit can be implemented.

Figure 2:
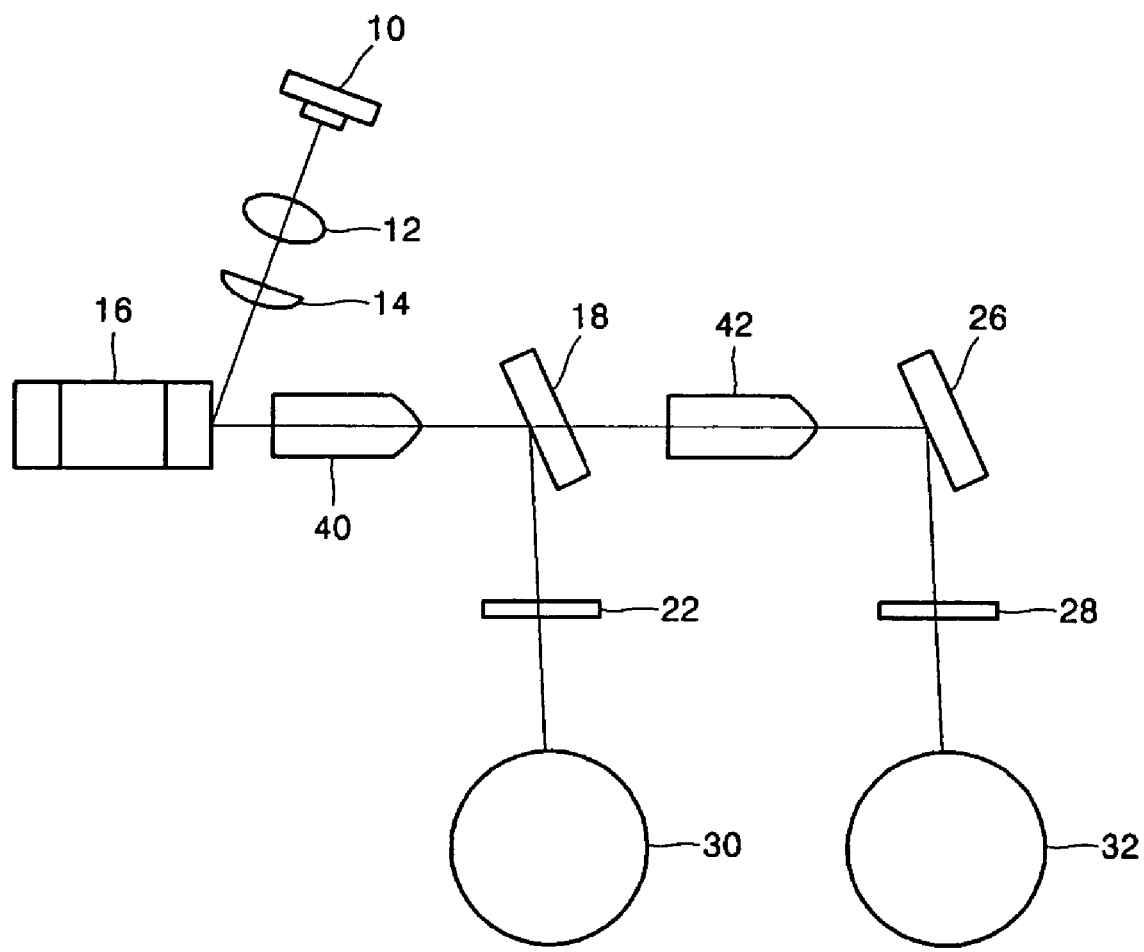
FIG. 2 illustrates a block diagram of an optical arrangement of a light scanning unit according to a second embodiment of the present invention.

Referring to FIG. 2, a configuration of a light scanning unit according to a second embodiment of the present invention is illustrated. The light scanning unit according to the second embodiment of the present invention differs from the configuration of the light scanning unit according to the first embodiment of the present invention in that a first F-θ lens 40 is placed between the polygonal rotating mirror 16 and the half-mirror 18. The second embodiment of the present invention further differs from the first embodiment in that a wavelength correction lens 42 is implemented as a refractive index correction unit for correcting the refractive index of the split light beams with respect to different wavelengths. The wavelength correction lens 42 is installed after the half-mirror 18 in the light path formed after the light beams are split by the half-mirror 18. The half-mirror 18 splits the light into a first split beam, which is directed towards the first exposed object, and into a second split beam, which is directed towards a second exposed object, after being reflected on the polygonal rotating mirror 16. The first F-θ lens 40 uniformly scans the light beam emitted from the composite light source 10 on the exposed surface of the first and second exposed objects 30, 32. The wavelength correction lens 42 corrects the refractive index of the second split light beam. The configuration according to the second embodiment of the invention is substantially the same as the configuration of the light scanning unit according to the first embodiment of the present invention, and thus, detailed descriptions thereof will be omitted.

In the second embodiment of the present embodiment, the F-θ lens 40 uniformly scans the light beam having a shorter wavelength of 650 nm emitted from the composite light source 10 onto the exposed surface of the first exposed object 30.

The wavelength correction lens 42 corrects the refractive index of the second split light beam so that, after the effect of the second bandpass filter 28, the light beam having a longer wavelength of 780 nm is scanned at a uniform speed in the main scanning direction on the exposed surface of the exposed object 32. When a laser beam having many wavelengths is formed as an image in almost the same light source position using the same optical system in a transmission optical system, the refractive index of light having a shorter wavelength is larger than the refractive index of light having a longer wavelength. Therefore, the focal distance of light having a shorter wavelength becomes shorter.

When light is transmitted through an F-θ lens, magnification in the main scanning direction on the exposed surface of the exposed object is varied in each exposed object, and position departure on the image occurs. In order to solve this problem, optical elements (e.g., F-θ lens) having different optical characteristics need to be used which are suitable for the wavelengths of each respective light beam in the plurality of light beams used.

However, if a different F-θ lens is installed for each of light beam having a different wavelengths, costs for the light scanning unit are increased. Thus, in the second embodiment of the present invention, the first F-θ lens 40 is suitable for the optical characteristic of a light beam having a shorter wavelength, and the refractive index of the light beam for the longer wavelength is corrected by the low-priced wavelength correction lens 42 after it is transmitted through the first F-θ lens 40.

In the second embodiment of the present invention, the optical system is configured to be suitable for a light beam having a short wavelength, and a light beam having a long wavelength wherein the lightbeam is corrected by the wavelength correction lens 42 so that a focal distance becomes longer.

In addition, in the second embodiment of the present invention, the first F-θ lens 40 is suitable for an optical characteristic of a light beam having a short wavelength. Conversely, the wavelength correcting lens 42 is suitable for a light beam having the optical characteristic of a long wavelength, such that the refractive index of the light beam having a long wavelength is corrected by the wavelength correction lens 42 after passing through the F-θ lens 40 so that the focal distance becomes shorter.

In the light scanning unit according to the second embodiment of the present invention, the wavelength correction lens 42 is used such that an expensive high-priced F-θ lens need not be installed in each of light beams having different wavelengths, and a cheaper light scanning unit can be implemented.

Figure 3:
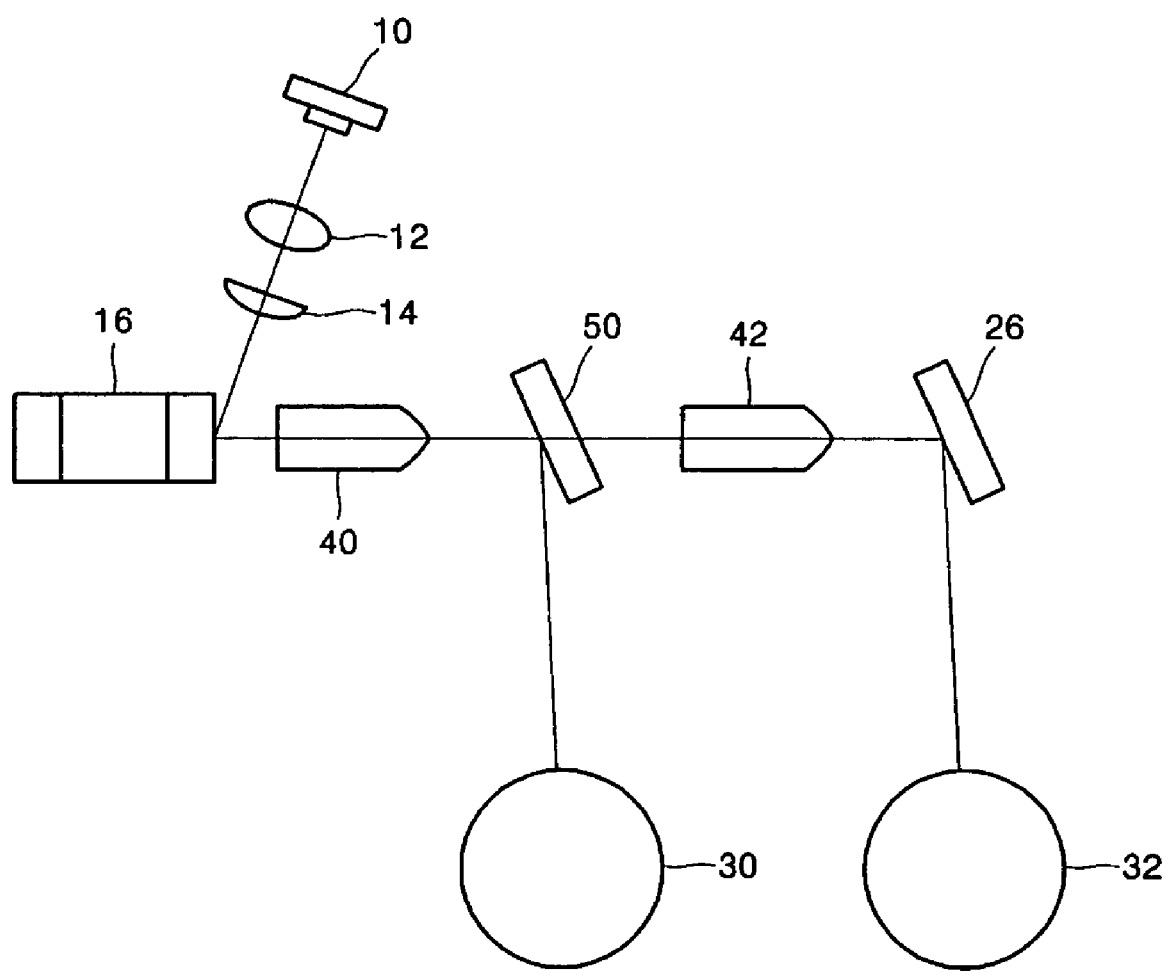
FIG. 3 illustrates a block diagram of an optical arrangement of a light scanning unit according to a third embodiment of the present invention.

Referring to FIG. 3, a configuration of a light scanning unit according to a third embodiment of the present invention is illustrated. The light scanning unit according to the third embodiment of the present invention differs from the configuration of the light scanning unit according to the second embodiment of the present invention in that in FIG. 3, a dichroic mirror 50, instead of the half mirror 18, is used, and first and second band pass filters 22, 28 of the second embodiment illustrated in FIG. 2 are omitted. The remaining elements of the configuration of a light scanning unit according to a third embodiment of the present invention are the same as the configuration of the light scanning unit according to the second embodiment of the present invention, and thus, detailed descriptions thereof will be omitted.

The dichroic mirror 50 reflects only a light beam having a predetermined wavelength, and transmits all other wavelengths. In the third embodiment of the present invention, the dichroic mirror 50 reflects only the light beam having the shorter wavelength of 650 nm emitted from the composite light source 10, and transmits the light beam having the longer wavelength of 780 nm.

In structure illustrated in FIG. 3, the light beam emitted from the composite light source 10 is collimated by the collimator lens 12, and then focused by the cylinder lens 14 and condensed onto the reflective surface of the polygonal rotating mirror 16.

The light beam reflected by the polygonal rotating mirror 16 is incident on the dichroic mirror 50 through the first F-θ lens 40. The dichroic mirror 50 reflects only a light beam having the shorter wavelength of 650 nm, and transmits the light beam having the longer wavelength of 780 nm.

Thus, the light beams emitted from the composite light source 10 (i.e., one light beam having a shorter wavelength of 650 nm and a second light beam having a longer wavelength of 780 nm) are split by the dichroic mirror 50 into a light beam having a shorter wavelength of 650 nm and a light beam having a longer wavelength of 780 nm. The light beam having the shorter wavelength of 650 nm is irradiated in a main scanning direction on the exposed surface of the first exposed object 30 by the rotational driving of the polygonal rotating mirror 16.

In addition, the refractive index of the light beam having the longer wavelength of 780 nm is corrected by the wavelength correction lens 42 and is irradiated in the main scanning direction on the exposed surface of the second exposed object 32 through the mirror 26 by the rotational driving of the polygonal rotating mirror 16.

According to the third embodiment of the present invention, light beams having different wavelengths are split by the dichroic mirror 50 such that band pass filters needs not to be used and the configuration of the light scanning unit is simplified compared to the configuration illustrated in accordance with the second embodiment of the present invention.

Figure 4:
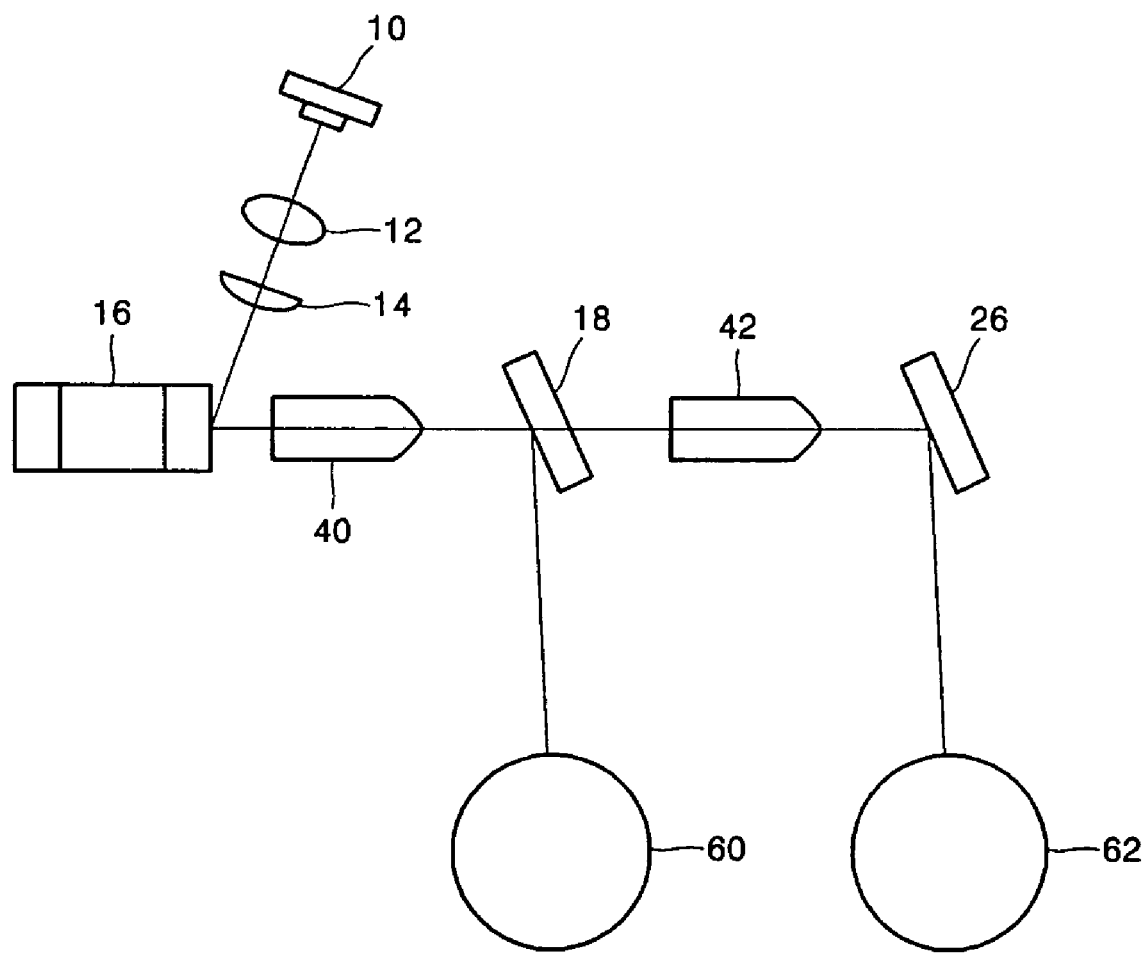
FIG. 4 illustrates a block diagram of an optical arrangement of a light scanning unit according to a fourth embodiment of the present invention.

Referring to FIG. 4, a configuration of a light scanning unit according to a fourth embodiment of the present invention is illustrated. The light scanning unit according to the fourth embodiment of the present invention differs from the configuration of the light scanning unit according to the third embodiment of the present invention in that in FIG. 4, the half mirror 18 is used instead of the dichroic mirror 50, and splitting of light beams having different wavelengths is performed using third and fourth exposed objects 60 and 62 which have different optical wavelength sensitivities. The other elements of the configuration of the light scanning unit according to the fourth embodiment of the present invention are substantially the same as the elements of the configuration of the light scanning unit according to the second embodiment of the present invention, and thus, detailed descriptions thereof will be omitted.

The third exposed object 60 has the optical characteristic of exhibiting sensitivity with respect to a light beam having a wavelength of 650 nm and substantially no sensitivity with respect to a light beam having a wavelength of 780 nm. Conversely, the fourth exposed object 62 has the optical characteristic of exhibiting sensitivity with respect to a light beam having a wavelength of 780 nm and substantially no sensitivity with respect to a light beam having a wavelength of 650 nm.

As shown in the structure illustrated in FIG. 4, the light beams emitted from the composite light source 10 are collimated by the collimator lens 12, and then are focused by the cylinder lens 14 and condensed onto the reflective surface of the polygonal rotating mirror 16.

The light beams reflected by the polygonal rotating mirror 16 are incident on the half mirror 18 through the first F-θ lens 40.

The light beams incident on the half mirror 18 are split into two parts, a first split light beam and a second split light beam. The first split light beam of is directly irradiated onto the exposed surface of the third exposed object 60, and is scanned in the main scanning direction on the exposed surface of the third exposed object 60 by the rotational driving of the polygonal rotating mirror 16. Since the third exposed object 60 has the optical characteristic of exhibiting sensitivity with respect to a light beam having a shorter wavelength of 650 nm and substantially little or no sensitivity with respect to a light beam having a longer wavelength of 780 nm, image information having a light beam of the shorter wavelength of 650 nm is recorded on the third exposed object 60.

The refractive index of the second split light beam is corrected by the wavelength correction lens 42 and is irradiated in the main scanning direction on the exposed surface of the fourth exposed object 62 through the mirror 26 by the rotational driving of the polygonal rotating mirror 16. Here, since the fourth exposed object 62 the optical characteristic of exhibiting a sensitivity with respect to a light beam having a longer wavelength of 780 nm, and substantially little or no sensitivity with respect to a light beam having a shorter wavelength of 650 nm, image information having a light beam of the longer wavelength of 780 nm is recorded on the fourth exposed object 60.

In this way, the third and fourth exposed objects 60, 62 having different optical wavelength sensitivities can be used such that light beams having different wavelengths can be split, and each light beam of a different wavelength is irradiated on the corresponding exposed object.

As described above, in the light scanning unit according to the fourth embodiment of the present invention, like the light scanning unit according to the third embodiment of the present invention, a band pass filter used to split light beams having different wavelengths emitted from the composite light source 10 with respect to different wavelengths can be omitted, and the configuration of the light scanning unit can be further simplified.

The light scanning units according to the various embodiments of the present invention, as described above, comprise a composite light source for emitting a plurality of light beams having different wavelengths, an optical system for light beams having different wavelengths, and an optical system which includes a polygonal rotating mirror so that the light beams with different wavelengths can reach the exposed objects, such that the configuration of the light scanning unit can be simplified, and a low-priced light scanning unit can be implemented.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A light scanning unit comprising:
   a composite light source comprising a plurality of light sources arranged adjacent to one another for emitting coherent light having different wavelengths, as a light beam; and
   an optical system comprising
   a collimator lens which is arranged on an approximately central axis of the light beam emitted by the composite light source and collimates the light beam emitted from the composite light source,
   a cylinder lens for condensing the light beam emitted from the collimator lens, and
   a polygonal rotating mirror for scanning the light beam condensed by the cylinder lens in a main scanning direction on an exposed surface of at least one exposed object,
   a half mirror, which splits the light beam emitted from the composite light source;
   an optical element, which comprises a band pass filter for transmitting light having a predetermined wavelength of the light beam split by the half mirror and splits light with respect to different wavelengths after being reflected by the polygonal rotating mirror; and
   a F-θ lens arranged on a light path between the half mirror and the band pass filter.

2. The light scanning unit of claim 1, wherein the optical system further comprises:
   an optical element, which splits the light beam with respect to different wavelengths after being reflected from the polygonal rotating mirror, so as to radiate different wavelengths onto respective exposed surfaces of different said exposed objects; and an F-θ lens arranged in a light path between the optical element and the polygonal rotating mirror.

3. The light scanning unit of claim 2, wherein the optical element comprises:

a half mirror, which splits the light beam emitted from the composite light source; and a band pass filter, which transmits only light having a predetermined wavelength of the light beam split by the half mirror.

4. The light scanning unit of claim 1, wherein the optical system further comprises:

an optical element, which splits the light beam with respect to different wavelengths after being reflected from the polygonal rotating mirror, so as to radiate light having respective different wavelengths onto respective exposed surfaces of different said exposed objects;

an F-θ lens arranged between the polygonal rotating mirror and the optical element; and a refractive index correction unit, which is arranged in a light path after the light beam is split by the optical element with respect to different wavelengths and corrects a difference in refractive index between optical elements having different refractive indexes with respect to each of the different wavelengths.

5. The light scanning unit of claim 4, wherein the optical element radiates at least one split light beam directly onto the exposed surface of the exposed object without passing through the refractive index correction unit after the light beam is split with respect to different wavelengths.

6. The light scanning unit of claim 4, wherein the optical element comprises:

a half mirror, which splits the light beam emitted from the composite light source; and a band pass filter, which transmits light having a predetermined wavelength the light beam split by the half mirror.

7. The light scanning unit of claim 1, wherein the optical system further comprises:

a mirror;

a second F-θ lens arranged on a light path between the half mirror and the mirror; and a second band pass filter for transmitting light having a predetermined wavelength to a second exposed object.

8. The light scanning unit of claim 1, wherein the at least one exposed objects each has different optical wavelength sensitivity.

9. A light scanning unit comprising:

a composite light source comprising a plurality of light sources arranged adjacent to one another for emitting coherent light having different wavelengths, as a light beam; and an optical system comprising a collimator lens which is arranged on an approximately central axis of the light beam emitted by the composite light source and collimates the light beam emitted from the composite light source, a cylinder lens for condensing the light beam emitted from the collimator lens, and a polygonal rotating mirror for scanning the light beam condensed by the cylinder lens in a main scanning direction on an exposed surface of at least two exposed objects;

wherein the optical system comprises a half mirror for splitting a light beam reflected by the polygonal rotating mirror and performs additional wavelength splitting by radiating each light beam split by the half mirror on different exposed objects having different optical wavelength sensitivities, wherein the light beam is incident upon the half mirror through a F-θ lens, the split light beam emerging from the mirror directly incident upon a first exposed object and incident upon a second exposed object through a refractive index correction unit.

10. A light scanning unit comprising:

a composite light source comprising a plurality of light sources arranged adjacent to one another for emitting coherent light having different wavelengths, as a light beam; and an optical system comprising a collimator lens which is arranged on an approximately central axis of the light beam emitted by the composite light source and collimates the light beam emitted from the composite light source, a cylinder lens for condensing the light beam emitted from the collimator lens, and a polygonal rotating mirror for scanning the light beam condensed by the cylinder lens in a main scanning direction on an exposed surface of at least two exposed objects;

wherein the optical system comprises a dichroic mirror for reflecting light having a predetermined wavelength of the light beam reflected by the polygonal rotating mirror and transmitting light having a wavelength different from the predetermined wavelength thereby splitting the light beam emitted from the composite light source, wherein the light beam is incident upon the dichroic mirror through an F-θ lens, the split light beam emerging from the mirror directly incident upon a first exposed object and incident upon a second exposed object through a refractive index correction unit.

* * * * *